United States Patent Office 3,316,782
Patented May 2, 1967

3,316,782
TORQUE CONTROL DEVICE
Lyell C. Tullis, Janesville, Wis., assignor to Gisholt Corp., Madison, Wis., a corporation of Wisconsin
Filed July 6, 1965, Ser. No. 469,498
9 Claims. (Cl. 81—52.5)

This invention relates to torque control devices and particularly to such a device which can be used on automatic assembly machines with satisfactory results within rather close tolerances.

Torque loads to be applied to nuts are generally specified within a tolerance range of say 10% and the angular rotation of the nut within this range runs 10°–20° in a typical situation, although this varies with the length of the bolt, thread conditions, amount of oil on the parts, etc. In many situations torque control hand wrenches are used because automatic machinery has not been available to meet the permissible tolerances.

The principal object of this invention is to provide a torque control device which can seat nuts with accurately controlled torque.

This device or system uses a stalling air motor which has per se been used in the past but in the present arrangement provision is made to absorb the stall motion of the air motor, generally considerably in excess of the permissible nut rotation, without applying excessive torque to the nut. Therefore, this device can apply a predetermined torque and absorb the inertial energy of the system without appreciably increasing the final torque on the nut. The device incorporates an elastic system which is preloaded to a desired torque and the air motor is set to stall at about this torque so the elastic system can absorb the inertia of the air motor and the device. By proper selection of the spring rate of the elastic system very little additional torque is applied during the stall. The elastic system lends itself to a simple readout arrangement indicating whether the torque is either above or below tolerance and, therefore, a reject.

Another object of this invention is to provide such a readout arrangement with a torque control device.

This readout arrangement can be readily adapted to control of the air motor to cut off the air supply when the desired torque is reached. This arrangement, however, uses some of the available overtravel for response purposes and takes away from the energy-absorbing travel.

Another object is to provide a rebound control to prevent any loosening of the nut if the air motor rebounds or backlashes upon stalling.

Other objects and advantages will be pointed out in, or be apparent from, the specification and claims, as will obvious modifications of the single embodiment shown in the drawings, in which:

FIG. 1 comprising FIGS. 1–A and 1–B is a vertical section through the entire assembly and the two figures would fit together end to end;

Figure 1:
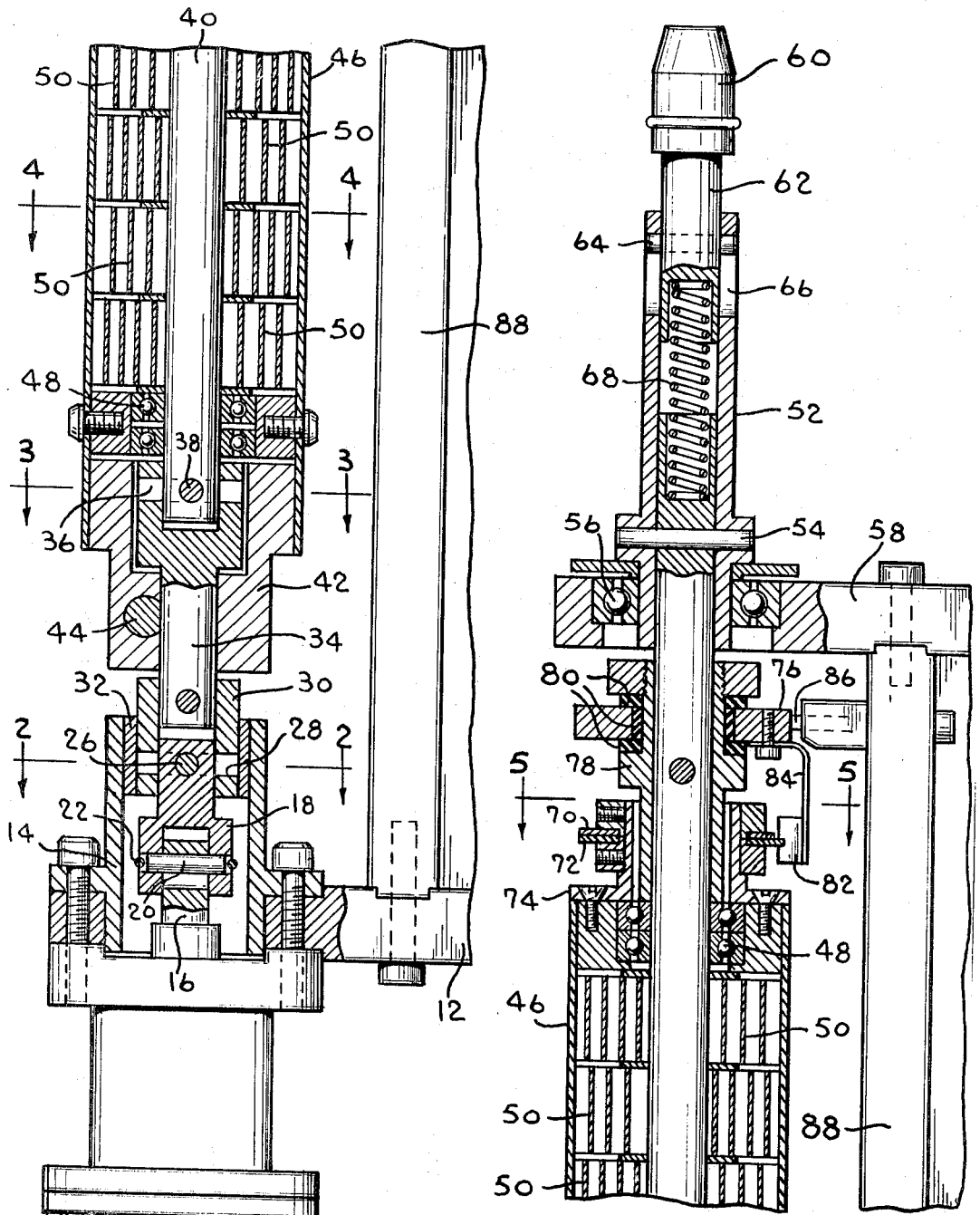
Figure 2:
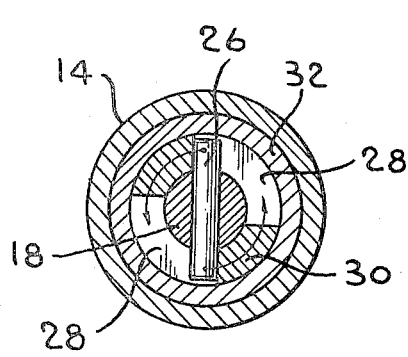
FIG. 2 is a section taken as indicated by line 2—2 in FIG. 1 to show the rebound or backlash control.
Figure 3:
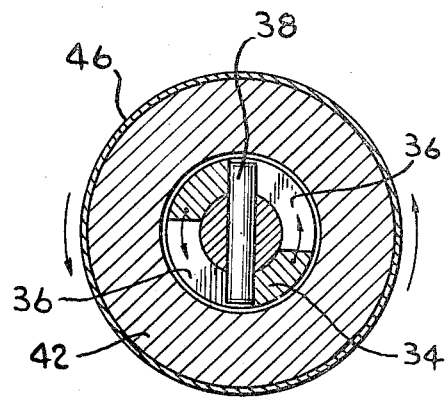
FIG. 3 is a section taken as indicated by line 3—3 in FIG. 1 and shows the provision for overtravel during the stalling of the air motor and overloading of the preload on the springs.
Figure 4:
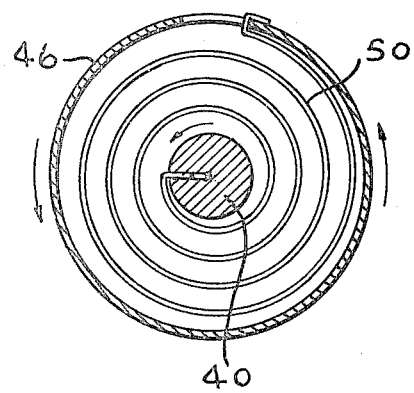
FIG. 4 is a section taken as indicated by line 4—4 in FIG. 1 showing the manner in which the springs are connected to the case and the shaft.
Figure 5:
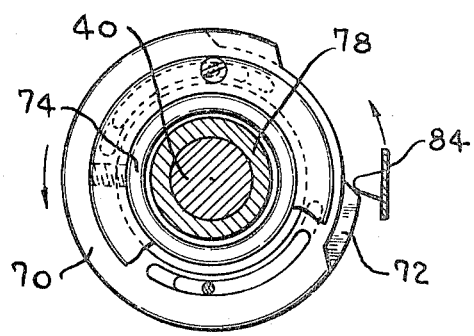
FIG. 5 is a section taken as indicated by line 5—5 in FIG. 1 to indicate the sensing arrangement.

A conventional air motor 10 is set to stall at about the predetermined minimum torque desired. If set slightly below the minimum the overtravel and slight increase in torque will still end up in the permissible torque range but if set high the ultimate torque may be too high. The motor is supported on bracket 12 which carries a sleeve 14 into which the motor shaft 16 extends. Shaft 16 is connected to shaft 18 by pin 20 retained by ring clamp 22. A pin 26 projects from shaft 18 into segmental slots 28 in connector sleeve 30 centered in support bearing 32. This pin and slot arrangement allows backlash or rebound of the air motor (when it stalls) without counterrotating the driven nut to thereby unload the nut. Sleeve 30 is pinned to the lower end of drive shaft 34 which is provided with segmental slots 36 receiving pin 38 carried in the lower end of driven or socket shaft 40 and allowing 90° relative rotation between shafts 34 and 40. Shaft 34 is carried in case end 42 and is normally fixed relative to the end 42 by tightening the draw plug which may, however, be loosened to permit adjustment of the preload as explained later. Case 46 is a tubular member having bearings 48, 48 adjacent each end to support socket shaft 40 to which the case is connected by the spiral torsion springs 50 the ends of which are connected to the shaft and case, as may be seen in the sectional view. These springs, which vary in number and rate in accordance with the torquing to be done, are preloaded by relatively turning the case and case end relative to drive shaft 34 before tightening the draw plug. When preloaded, the drive to the socket shaft is through the springs with pin 38 oriented in slots 36, as seen in FIG. 3, until the predetermined torque is reached, at which time the pin moves in slots 36 and the springs are additionally loaded but at a low rate with proper selection of the springs.

The upper end of shaft 40 projects from the case and has socket fitting 52 connected thereto by pin 54. Fitting 54 is rotatably carried in bearings 56 supported in upper bracket 58. Socket 60 is carried on shaft 62 having a pin 64 running in longitudinal slots 66 in fitting 52 to allow limited longitudinal motion of the socket relative to the fitting. The socket is biased outwardly by compressed spring 68.

The preload of springs 50 can be set by loosening draw plug 44, holding case 46, and applying a torque wrench to the socket. Before the draw plug is tightened, pin 38 should be checked to be certain it is seated in the proper end of the slot 36. If the air motor has also been properly set the air motor will stall and the spring 50 preload will be overcome at about the minimum torque. The air motor drives a considerable mass (the socket shaft, etc. being the low mass—low inertia part of the drive) and there must be some continued rotation—at this moment the pin 38 moves in slots 36 and, in effect, winds up the springs 50 but due to the low spring rate the added force (torque) will not drive the nut torque out of the tolerance range although the torque will be increased during this "windup." The pin and slot arrangement allows 90° overtravel during stall and this is ample to stop the motor. If more travel was needed the drive would "go solid" and increase the torque excessively. When an air motor stops it frequently rebounds or backlashes and this could loosen the driven nut. To avoid this the backlash control (pin 26 and slot 28) allows 90° reversal without imparting motion to the sleeve shaft 30.

When the air motor stalls there is relative rotation between the case 46 and the socket shaft 40. This relative motion can be used to indicate whether the driven nut torque is within tolerance. Thus indicator cams 70, 72 are adjustably fixed on support 74 fixed on the upper end of case 46 and commutator 76 is carried by and insulated from sleeve 78 by insulators 80 with the sleeve pinned to shaft 40. The commutator carries electrical pickup 82 on arm 84 and receives a low voltage signal from brush 86 carried by and insulated from the bracket 88. The cams are set to indicate the limits of relative rotation— that is when the pin 38 contacts either end of slot 36 or the range of motion within which the tolerance level lies.

After the motor stalls and stops, if the pickup touches either cam, a circuit can be completed through brush 86, commutator 76, arm 84, pickup 82, and the cam and its associated metal support and the machine. This circuit can then indicate a reject—either above or below the torque tolerance range.

Although but a single embodiment of the present invention has been illustrated and described, it will be apparent to those skilled in the art that various changes and modifications may be made therein without departing from the spirit of the invention or from the scope of the appended claims.

I claim:

1. Apparatus for driving nuts and seating them with a predetermined torque, comprising, an air motor set to stall at approximately said torque, a shaft driven by the air motor, a lost motion connection between the shaft and the motor, spring means loading the lost motion connection in a direction such that the air motor can overrun the shaft by taking up lost motion against the force of the spring means, said spring means being preloaded to yield at about the minimum torque desired and having a low spring rate whereby the torque is not increased above the maximum permissible torque within the range of lost motion.

2. Apparatus according to claim 1 including a second lost motion connection between the motor and the first lost motion connection and effective upon reverse rotation of the motor to prevent reverse rotation of the shaft within the limits of the available lost motion.

3. Apparatus according to claim 1 including means sensing the relative rotation between the input and output of the lost motion connection to indicate whether the motion falls within a permissible range upon stopping the motor.

4. Apparatus for applying a predetermined torque to a driven nut comprising, an input shaft, an output shaft for driving a nut, a lost motion connection between the shafts permitting limited rotation of the input and output shafts, a casing coaxial with the output shaft, a plurality of torsion springs coiled around the output shaft with each having one end connected to the output shaft and the other end connected to the casing, the casing being movable with respect to the input shaft to preload the springs, means for locking the casing with respect to the input shaft to retain the desired preload, the springs being preloaded in the direction causing the drive force to be transmitted to the driven shaft through the springs with the springs yielding at a predetermined torque to allow the input shaft to overrun the output shaft within the limits of the lost motion connection.

5. Apparatus according to claim 4 including a drive shaft, a second lost motion connection between the drive shaft and the input shaft, said second lost motion connection providing a direct drive from the drive shaft to the input shaft and allowing limited lost motion upon rebound or backlash of the drive shaft to prevent reverse rotation of the nut by reason of the rebound or backlash.

6. Apparatus according to claim 4 including indicator means carried by the casing and angularly spaced to indicate maximum and minimum permissible rotation of the casing relative to the output shaft, sensing means carried by the output shaft and cooperating with the indicator means to determine whether the angular relationship of the casing and output shaft is acceptable upon stopping the input shaft.

7. Apparatus according to claim 6 including an air motor set to stall at a predetermined torque approximately the same as the torque which will overcome the preload of the springs.

8. Apparatus according to claim 7 including a second lost motion connection located between the air motor and the input shaft and allowing limited rebound of the air motor upon stalling without reversing the rotation of the input shaft.

9. The combination with a torquing device including an air motor set to stall at a predetermined torque, of means for reducing the torque increase due to the motor overrun between stalling and stopping, comprising, a drive having an input and an output and including a lost motion connection and elastic means, said elastic means being preloaded so the drive is through the elastic means until approximately said predetermined torque is reached at which time the elastic means yields and the lost motion connection allows the motor to overrun the output, the elastic means being selected to increase the torque on the output only slightly during the overrun.

References Cited by the Examiner

UNITED STATES PATENTS

| | | | |
|---|---|---|---|
| 2,013,938 | 9/1935 | Williams. | |
| 2,256,496 | 9/1941 | Robinson | 173—93.5 |
| 2,378,956 | 6/1945 | Thorner | 81—52.4 XR |
| 3,156,309 | 11/1964 | Swenson | 173—93 |

JAMES L. JONES, JR., *Primary Examiner.*